No. 637,117. Patented Nov. 14, 1899.
C. HOLLIWELL & W. J. LEWIS.
MOLD FOR LINOTYPE MACHINES.
(Application filed Feb. 18, 1899.)
(No Model.) 3 Sheets—Sheet 1.
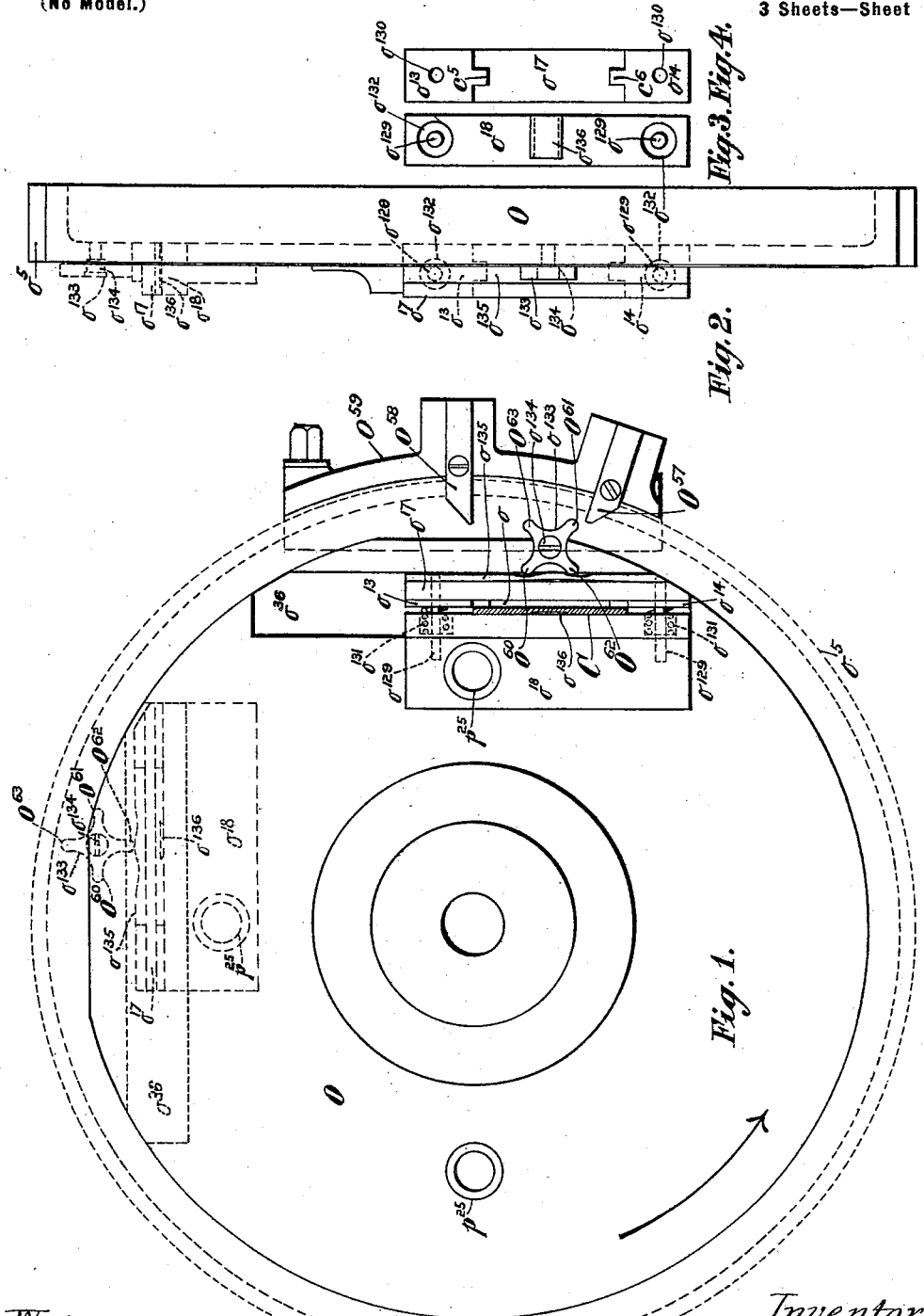
Witnesses.
Inventors.

No. 637,117. Patented Nov. 14, 1899.
C. HOLLIWELL & W. J. LEWIS.
MOLD FOR LINOTYPE MACHINES.
(Application filed Feb. 18, 1899.)
(No Model.) 3 Sheets—Sheet 2.
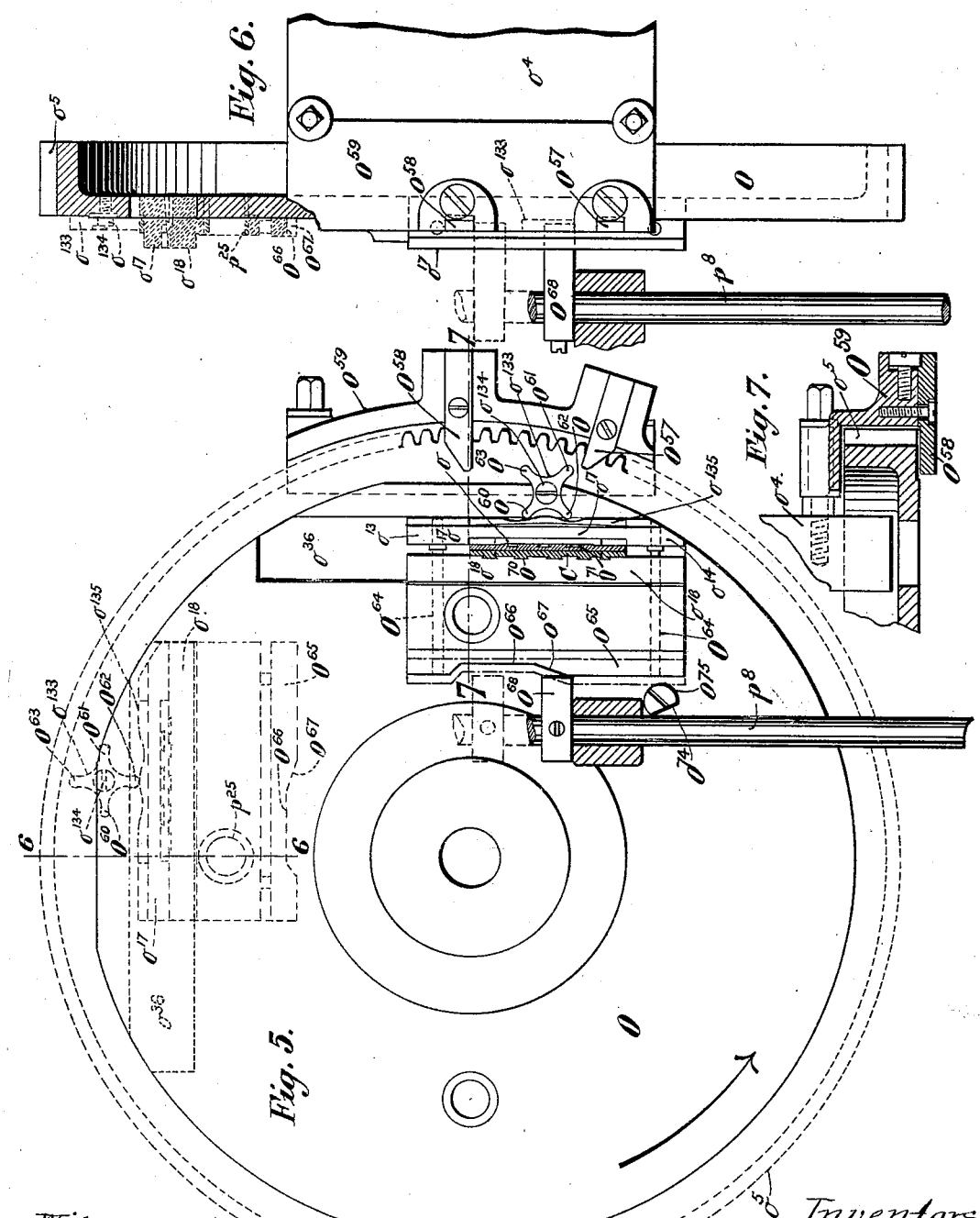
Witnesses.
Inventors.

No. 637,117. Patented Nov. 14, 1899.
C. HOLLIWELL & W. J. LEWIS.
MOLD FOR LINOTYPE MACHINES.
(Application filed Feb. 18, 1899.)
(No Model.) 3 Sheets—Sheet 3.
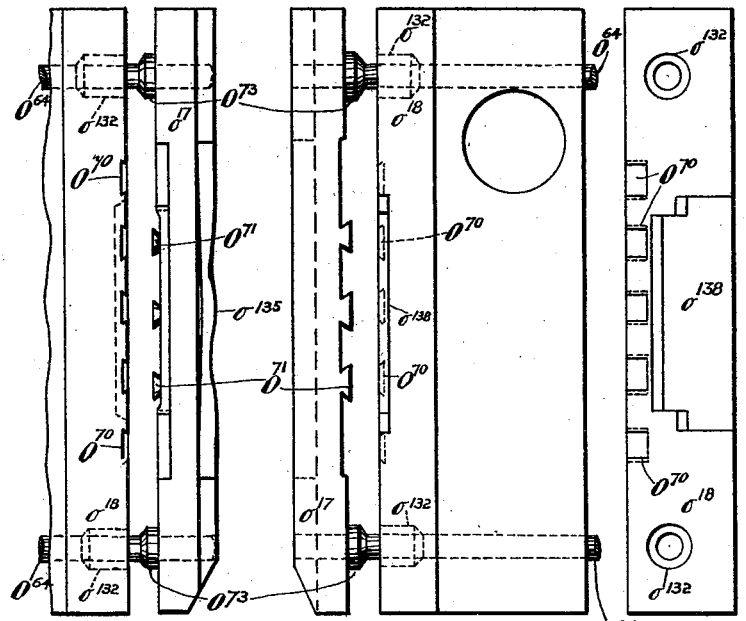
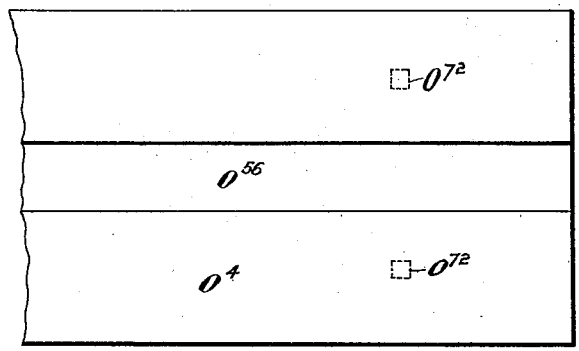
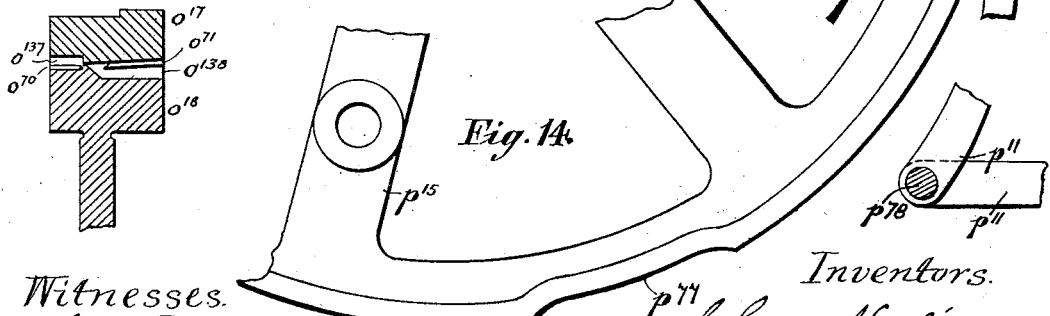
THE NORRIS PETERS CO., PHOTO-LITHO., WASHINGTON, D. C.

UNITED STATES PATENT OFFICE.

CHARLES HOLLIWELL AND WARWICK J. LEWIS, OF BROADHEATH, ENGLAND, ASSIGNORS TO THE MERGENTHALER LINOTYPE COMPANY, OF NEW YORK, N. Y.

MOLD FOR LINOTYPE-MACHINES.

SPECIFICATION forming part of Letters Patent No. 637,117, dated November 14, 1899.

Application filed February 18, 1899. Serial No. 706,035. (No model.)

*To all whom it may concern:*

Be it known that we, CHARLES HOLLIWELL and WARWICK J. LEWIS, of Broadheath, in the county of Chester, England, have invented certain new and useful Improvements in Mechanism for Coring the Molds of Linotype-Machines; and we do hereby declare the following to be a full, clear, and exact description of the invention, such as will enable others skilled in the art to which it appertains to make and use the same.

The present invention consists in improvements upon the mechanism described in the specification of British Letters Patent No. 6,170, dated March 19, 1896, for coring the molds of the linotype-machine described in the specification of Letters Patent of the United States No. 436,532, dated September 16, 1890. In that machine the mold is built up of four pieces—a cap-plate, a bottom-plate, and two distance-pieces—the whole held together by screws to form a mold-block having a horizontal rectangular slot or mold-cavity for the body of the linotype, the cavity extending through the block from the front to the rear of it, the linotype being without notches or indentations and of such form that it may be pushed directly out of the mold without separating or opening the latter. The said block is carried by a gear-wheel commonly known as the "mold-wheel," and to which it is fixed with its cavity standing parallel with a diameter of it and in a hole in it, so that the said block extends through the wheel. The wheel is turned about its axis through a certain arc and moved forward to hold the mold-cavity in the casting position between the composed line of matrices and space-bars in front of it and the metal-pot mouthpiece behind it, whereupon the linotype is cast. The metal-pot and mold-wheel are then moved back, and the mold-wheel is turned again to hold the said cavity with the linotype in it between the ejector and the galley and moved forward again, whereupon the blade of the ejector is advanced through the said cavity and pushes the said linotype out into the galley.

In the molds above referred to, the parts of which were inseparably united when in use, it was impossible to cast linotypes of irregular forms—that is to say, with notches or indentations therein—as is sometimes required in order to hold them in special printing-presses—or to cast them of less than the full type height.

The object of the present invention is to construct an automatically-acting mold the parts of which are separated after the casting action and so formed as to permit the ejection of linotypes having notches or cavities in their ends, their bases, or both.

According to the invention described in the first-mentioned patent, the coring of the mold-cavity is effected by passing a core or cores down into it through the cap-plate just before the linotype is cast and withdrawing them soon enough to clear the advancing ejector-blade. There is, however, one imperfection in that invention, and it is that the width of the core or cores (transversely of the mold-cavity, that is) may be and sometimes is sufficient to weaken the cap-plate, thereby depriving it of the degree of rigidity necessary to it as an operative member of the mold-block. So long as the cores are narrow the necessary rigidity of the cap-plate is not interfered with; but as their width increases the cap-plate is weakened, for in any case there must be holes through it large enough for the cores to work through.

The present invention, like the one just mentioned, has been conceived and developed with special reference to the machine described in the second patent above mentioned, and for that reason its application to that machine has been selected for illustration and detailed description. It does not require any core-holes in or through the cap-plate, but provides for the integrity of it being maintained by fastening the cores, as well as the distance-pieces, to the casting-face—*i. e.*, the face that forms the respective side of the mold-cavity—of the cap-plates. The cores being then a fixture within the mold-cavity, it becomes necessary to open the mold by moving the cap-plate away from the bottom one for a distance not less than the thickness of a linotype, in order that there may be room for the cores and the linotype to stand clear of each other when the ejector-blade advances. Preferably only the cap-plate is movable, not the bottom-plate as well or as an alternative, but only because for reasons outside this invention it is desirable that the bottom-plate be a fixture upon the mold-wheel.

The newly-cast linotype is held to the bottom-plate when the mold is open by means of a double V-ridge standing across the face of that plate, the ejector-blade being slotted to clear it. The mold must be closed by moving the cap-plate toward the bottom-plate till the distance-pieces are in metal-tight contact with the casting-face of the latter and locked in that position before the mold-wheel reaches the casting position. The type of closing and locking device is varied, according as to whether it is outside the mold-block or whether it is between the latter and the axis of the mold-wheel.

The invention includes improved means for casting narrow linotypes such as are required for late news on printing-machines whose cylinders may not be cut away to make room for linotypes of full width. These linotypes are generally cored out either in their ends or in their feet. In either case the cores are made fast to the cap-plate, as already described. While the narrow linotype is held to the bottom-plate the sprue is held to the cap-plate by similar means, so that it is broken off the linotype when the mold is opened. The ejector-blade is provided with a lateral projection adapted to eject the said sprue from the mold-cavity without pushing it beyond, so that it drops therefrom instead of being pushed forward into the trimming mechanism.

Referring to the accompanying figures, which are to be taken as part of this specification and read therewith, Figure 1 is a front elevation showing the mold-block in the ejecting position and opened for the ejection of a full-width linotype having cored ends and also the same mold-block closed subsequently for the casting of the next one; Fig. 2, a side elevation corresponding with Fig. 1, but omitting the fingers that turn the star-wheel; Fig. 3, a plan of the casting-face of the bottom plate; Fig. 4, a plan of the casting-face of the cap-plate; Fig. 5, a front elevation showing the mold-block in the ejecting position and opened for the ejection of a narrow linotype and its sprue and also the same mold-block closed subsequently for the casting of the next one; Fig. 6, a side elevation corresponding with Fig. 5 and in section for the distance represented by the line 6 6 of that figure; Fig. 7, a horizontal section on the line 7 7 of Fig. 5, omitting the mold-block; Fig. 8, a front elevation, on an enlarged scale, of as much of the opened mold-block illustrated in Fig. 5 as immediately surrounds the mold-cavity; Fig. 9, a rear elevation of the same mold-block; Fig. 10, a plan of the casting-face of the bottom-plate; Fig. 11, a plan of the casting-face of the cap-plate; Fig. 12, a front elevation, and Fig. 13 a part side elevation, together illustrating the necessary modifications in the ejector-blade; and Fig. 14, a detail illustrating the necessary modification of the mold-wheel cam. Fig. 15 is a cross-section from front to rear of the mold shown in Figs. 8 and 11.

O is the mold-wheel; $o^5$, the gear with which its driving-pinion (not shown) engages; $o^{17}$, the cap-plate; $o^{18}$, the bottom-plate; $o^{13}$ $o^{14}$, the two distance-pieces, the four last-mentioned parts constituting the mold-block; $o$, the horizontal slot or mold-cavity in it; $o^{36}$, the hole in the wheel O, into which the rearwardly-projecting portions of the mold-block project, and $p^{25}$ $p^{25}$ sockets to receive the stop-pins for the mold-wheel when it slides forward, as heretofore.

According to the present invention the cores $c^5$ $c^6$ and the distance-pieces $o^{13}$ $o^{14}$ are made fast to the casting-face of the cap-plate $o^{17}$, as shown in Figs. 1 and 4.

It should be noted with reference to the cores that neither the shape of them nor the position of them in the linotype has anything to do with the present invention. The only respect in which the latter affects them is their being fast on the cap-plate $o^{17}$ instead of being passed through it.

The provision illustrated in Figs. 1 to 4 for the cap-plate $o^{17}$, being movable away from the bottom-plate $o^{18}$, consists of a pin $o^{129}$, fast to and projecting from each end of the bottom plate $o^{18}$ in the direction of the cap-plate $o^{17}$, holes $o^{130}$ through the latter to receive the said pins, and an expanding spiral spring $o^{131}$, seated in a circular socket $o^{132}$ in the casting-face of the bottom-plate $o^{18}$ about each pin $o^{129}$ and constantly pushing against the distance-pieces $o^{18}$ $o^{14}$. The pins $o^{129}$ are long enough to allow of the cap-plate $o^{17}$ being moved away from the bottom-plate $o^{18}$ for a distance not less than the thickness of the linotype C, as shown in Fig. 1. The cap-plate $o^{17}$ is prevented from being moved too far by the outer side of the hole $o^{36}$, the rear portion, which stands in that hole, being thinner than heretofore to allow of the above-described motion of the said cap-plate. As the latter is moved away from the bottom-plate $o^{18}$, it leaves the linotype C unsupported. At this time the mold stands in a vertical position, with the linotype on end. To prevent the linotype falling over toward the cap-plate, there is an undercut or dovetail $o^{136}$ extending transversely across the casting-face of the bottom-plate $o^{18}$ for about three-quarters of the width of the latter, more or less, and which holds the linotype C in its normal vertical position close up to the plate $o^{18}$ by reason of the linotype metal engaging behind the said ridge, as illustrated in Fig. 1, the linotype C being drawn in section to show that engagement. The ejector-blade $O^4$ has a suitable longitudinal groove $O^{56}$ in it to clear the said ridge $o^{136}$, as illustrated in Figs. 12 and 13.

The ridge $o^{136}$ may be replaced by undercut grooves $O^{70}$, described farther on with reference to Figs. 5, 8, 9, and 10.

The preferred device for unlocking the mold and closing and locking it again consists of a star-wheel $o^{133}$, pivoted by a stud $o^{134}$ on the face of the mold-wheel O, so as to turn in a plane parallel therewith, as indicated in Figs. 1, 2, 5, and 6. The stud $o^{134}$ stands at equal distances from the two ends of the cap-plate $o^{17}$, and the length of the teeth of the star-wheel $o^{133}$ is such that if any one of them be set to stand in the direction of the mold-cavity $o$ and at right angles with it it will close the mold by moving the cap-plate $o^{17}$ toward the bottom plate $o^{18}$ until the distance-pieces $o^{13}$ $o^{14}$ on the former are in metal-tight contact with the casting-face of the latter and lock it there. There is advantageously interposed between the top of the cap-plate $o^{17}$ and the star-wheel $o^{133}$ a spring-bar $o^{135}$, made fast by its two ends to the said top, from which it stands clear for a short distance, as shown in Figs. 1 and 5, so that when the said tooth has pushed the cap-plate $o^{17}$ up to the bottom-plate $o^{18}$ in the way described the spring-bar $o^{135}$, being then in tension, exerts a spring-pressure upon the said cap-plate $o^{17}$ in the direction of the bottom-plate $o^{18}$.

The device by which the star-wheel $o^{133}$ is moved to unlock the cap-plate $o^{17}$ and to close the mold and to lock the said plate $o^{17}$ again after the linotype C has been ejected from the mold-cavity $o$ consists of two fingers $O^{57}$ $O^{58}$, which are held to the frame of the machine by any suitable means, so that they shall both stand in the plane of the teeth of the star-wheel $o^{133}$. Both fingers are shown as screwed to a piece $O^{59}$, which is fixed to the mold-wheel slide $o^4$, as shown in Figs. 6 and 7. The finger $O^{58}$ projects nearer to the axis of the mold-wheel O than does the finger $O^{57}$, for a reason which is explained farther on. The arcual distance between them and their position with reference to the mold-block will be clearly understood from the following description of the way in which the invention constructed as described above works. When the mold-wheel O is in the casting position, the mold-block is in the position and condition illustrated by the dotted lines in Figs. 1, 2, 5, and 7. At that time one of the teeth of the star-wheel $o^{133}$—say the tooth $O^{60}$—is holding the cap-plate $o^{17}$ locked down with its distance-pieces $o^{13}$ $o^{14}$ in metal-tight contact with the bottom plate $o^{18}$. After the linotype C has been cast the wheel O is turned in the direction of the arrows in Figs. 1 and 5 through an arc of two hundred and seventy degrees, so holding the mold-cavity with the linotype in it between the ejector-blade $O^4$ and the trimming-knives. The said wheel is then ready to be moved forward into the ejecting position. Toward the end of that arc the tooth $O^{61}$, being the one opposite to the then locking-tooth $O^{60}$ and projecting farther than any of the four from the axis of the mold-wheel O, finds the finger $O^{57}$ projecting into its path sufficiently far to turn it through an arc of forty-five degrees, which suffices to make the star-wheel $o^{133}$ assume the position illustrated by the full lines, thereby unlocking the cap-plate $o^{17}$ and allowing the springs $o^{131}$ to open the mold, as shown. So long as the cap-plate $o^{17}$ is unlocked the teeth $O^{60}$ $O^{62}$ are in equal touch with the spring-bar $o^{135}$, thereby holding the star-wheel $o^{133}$ steady. The mold-wheel O is then moved forward into the ejecting position, and the linotype is ejected, as heretofore. The ejector-blade $O^4$ is then retracted, and the mold-wheel O, after having been moved back, is moved through an arc of ninety degrees in the same direction as before. The tooth $O^{63}$ then finds the finger $O^{58}$ projecting into its path far enough to turn the star-wheel $o^{133}$ to make the tooth $O^{62}$ close the mold again in readiness for the next cast, as illustrated by the dotted lines in Figs. 1, 2, 5, and 7. Each of the four teeth of the star-wheel $o^{133}$ takes the several duties in turn. The radial distance of the tip of the tooth $O^{61}$ from the axis of the wheel O before its contact with the finger $O^{57}$ is greater than that of the tooth $O^{63}$ before its contact with the finger $O^{58}$. Hence the latter must be correspondingly longer than the finger $O^{57}$.

Referring to Figs. 5, 6, and 7 there is illustrated therein a modification of the device for opening the mold. According to it the pins $o^{129}$ are replaced by pins $O^{64}$. The cap-plate $o^{17}$ fits over these in the same way as it does over the pins $o^{129}$. The pins $O^{64}$ instead of being fast to the bottom-plate $o^{18}$, as are the pins $o^{129}$, pass through holes therein, in which they work with a working fit, and extending beyond it for a distance equal to the opening movement of the cap-plate $o^{17}$ are made fast in a rigid bridge-piece $O^{65}$. $O^{73}$ is a collar fast on each pin $O^{64}$. To control the opening motion of the bridge-piece $O^{65}$, a stop $o^{75}$ is provided. It is shown as consisting of the head of a screw turning in the mold-wheel O, notched for being turned therein and having a flat side $O^{74}$, the radial distance of the latter from the axis of the screw being less than that of the arcual side $O^{75}$, for a reason explained farther on. The said side $O^{75}$ stands opposite the bridge-piece $O^{65}$ when the mold is only to be opened for the ejection of a linotype. The function of the flat side $O^{74}$ is described farther on. $O^{66}$ is a recess in, and $O^{67}$ is a decline on, the face of the bridge-piece $O^{65}$, on the side of it next to the axis of the mold-wheel O, and $O^{68}$ is a projection fast on the customary rod $p^8$, being one of the usual justification-rods. This rod is reciprocated vertically by a cam, a bell-crank lever, and a spring. $p^{15}$ (see Fig. 14) is the cam. It is rotated in the direction indicated by the arrow. $p^{11}$ is the lever, and $p^{76}$ its fulcrum. The horizontal and longer arm of it is continued toward the front of the machine, where its front end is suitably connected to the rod $p^8$, while its shorter arm terminates in an antifriction-roller $p^{71}$, as illustrated in the above-mentioned specification of 1890. The spring above mentioned (omitted from the figure for want of space) is beneath the lever $p^{11}$, bearing on it at a point between the fulcrum $p^{70}$ and the front end of it. Being always in compression it is always ready to move the rod $p^8$ upward. For the same reason it keeps the roller end $p^{71}$ in contact with the periphery of the cam $p^{15}$. The rod $p^8$ is depressed by the rises on the cam, and it rises whenever a drop therein, such as the one $p^{77}$, comes opposite the roller end $p^{71}$.

The modification just described works as follows: Just before the mold-wheel O is moved forward into the ejecting position the cam $p^{15}$ presents the drop $p^{77}$ to the roller $p^{71}$, and the rod $p^8$ is raised accordingly, thereby bringing the projection $O^{68}$ rearwardly opposite to the recess in $O^{66}$. The mold-wheel O is then moved forward into the ejecting position, and the cam-rise $p^{76}$ engages the roller $p^{71}$, thereby depressing the rod $p^8$, moving the projection $O^{68}$ downward over the decline $O^{67}$ to open the mold by pushing the bridge-piece $O^{65}$ to the right and the collars $O^{73}$ against the cap-plate $o^{17}$.

It will be observed that as the present invention places the mold-cavity for the linotype in the cap-plate $o^{17}$ it will frequently be necessary to change the latter. To allow of this being done, the sockets $o^{132}$ are deep enough to allow of the collars $O^{73}$ being drawn into them far enough for the pins $O^{64}$ to be drawn out of the cap-plate $o^{17}$, (see Figs. 8 and 9,) the radial distance of the flat side $O^{74}$ of the stop being less than that of the arcual side $O^{75}$ to allow of the bridge-piece $O^{65}$ being moved accordingly. When the stop is turned until its flat side $O^{74}$ is opposite to and parallel with the respective face of the bridge-piece $O^{65}$, the latter can be moved from the bottom-plate $o^{18}$ far enough to draw the pins $o^{64}$ out of the holes $o^{130}$ in the cap-plate $o^{17}$, so leaving the latter free to be removed.

The mechanism for making narrow linotypes and breaking off their sprues from them may or may not have combined with it cores for coring out those linotypes, as may be desired. It is illustrated in detail in Figs. 8, 9, 10, and 11, which show a core $c^{20}$ for forming a double-V recess in the foot of the narrow linotype $C^{26}$. The latter is held to the bottom-plate $o^{18}$ either by one or more ridges $o^{136}$, described with reference to Figs. 1 and 3, or by one or more double-V grooves $O^{70}$. These latter will of course leave ridges upon the respective side of the linotype, but they will be removed by the trimming-knife. When the cap-plate $o^{17}$ is moved up to the bottom-plate $o^{18}$, the core $c^{20}$ is separated from the latter by a distance only just wide enough to pass metal from the linotype $C^{26}$ into its mold-cavity $o^{137}$. The metal flows into the latter between the ridges $c^{21}$ $c^{21}$ on the ends of the core $c^{20}$.

$o^{138}$ is the mold-cavity for the sprue. Starting from the rear edge of the edge of the core $c^{20}$ the mold-cavity $o^{138}$ slopes rearward away from its opposite side in the bottom-plate $o^{18}$, as shown in Fig. 11.

$O^{71}$ $O^{71}$ are undercut ridges standing across the sloped face of the mold-cavity $o^{138}$ and adapted after the manner described with reference to the ridge $o^{136}$ in Figs. 1 and 3 to hold the sprue to the cap-plate $o^{17}$ when the latter is being moved away from the bottom-plate $o^{18}$. The above-mentioned slope on one side of the cavity $o^{138}$ produces an elevation on the cap-plate $o^{17}$ along the junction of the two cavities $o^{138}$ and $c^{137}$, which has the effect of making the connection between the linotype and the sprue so thin that they readily part by fracture along that junction when the cap-plate $o^{17}$ is moved away from the bottom-plate $o^{18}$. Fig. 5 shows the sprue parted or broken from its linotype and both still held to the respective plate $o^{18}$ $o^{17}$.

After both narrow linotype and its sprue have been cast the mold-wheel O is moved through its arc of two hundred and seventy degrees and the mold is opened by either of the devices already described, thereby breaking the linotype and the sprue away from each other along the junction of their respective mold-cavities. This parting by fracture is shown in Fig. 5. The ejector-blade $O^4$ is then advanced and ejects the linotype $C^{26}$ from the mold-cavity $o^{137}$, pushing it through the trimming-knives into the galley. The sprue is ejected by the studs $O^{72}$ $O^{72}$, which project laterally from the respective side of the ejector-blade $O^4$. They stand on the blade $O^4$ far enough to the rear of the nose of it to prevent them touching the trimming-knives and eject the sprue to one side of them. The mold is then closed as the mold-wheel moves through the ninety-degree arc into the casting position in the way already described.

It will be observed that in each form of mold herein shown the linotype is held by one member of the mold while the other member retreats, carrying with it the cores or projections which form the cavities in the linotype, and that thereafter the linotype is ejected edgewise from the mold in the ordinary manner, its retaining devices being formed to permit such movement.

We claim—

1. A linotype-mold, comprising two separable members, between which the linotype is cast, one having a core to form an opening through the linotype, and the other having surfaces substantially as described to interlock and hold the linotype during the withdrawal of the core, but allowing the subsequent ejection of the linotype as usual.

2. In a linotype-machine and in combination with mechanism for opening and closing the same after each casting operation, a mold, comprising two members between which the linotype is cast, one member having a core or cores to form openings in the linotype, and the other having transverse ribs to engage and hold the linotype during the withdrawal of the core, while permitting its subsequent ejection in an edgewise direction.

3. The hereinbefore-described combination in the casting mechanism of a linotype-machine, of a mold bottom-plate and a mold cap-plate capable of being separated for a distance not less than the thickness of a linotype to open the mold, one of them having a core or cores fast to the casting-face of it; a mold-cavity in one of the said plates for a narrow linotype; a mold-cavity for the sprue; and an elevation on the casting-face of one of them in the direction of that of the other plate along the junction of the respective mold-cavities for the linotype and the sprue.

4. The hereinbefore-described combination in the casting mechanism of a linotype-machine, of a mold bottom-plate and a mold cap-plate capable of being separated for a distance not less than the thickness of a linotype to open the mold, one of them having a core or cores fast to the casting-face of it; a mold-cavity for a narrow linotype; a mold-cavity for a sprue; a device on or in the casting-face of each plate to hold the linotype and sprue respectively thereto; and an elevation on the casting-face of one plate in the direction of that of the other plate along the junction of the respective mold-cavities for the linotype and the sprue.

5. The hereinbefore-described combination in the casting mechanism of a linotype-machine, of a mold bottom-plate and a mold cap-plate capable of being separated for a distance not less than the thickness of a linotype to open the mold, one of them having a core or cores fast to the casting-face of it; a mold-cavity for a narrow linotype; a mold-cavity for a sprue; a device on or in the casting-face of each plate to hold the linotype and sprue respectively thereto; an elevation on the casting-face of one plate in the direction of that of the other plate along the junction of the respective mold-cavities for the linotype and the sprue; and mechanism for opening and closing the mold.

6. The hereinbefore-described combination in the casting mechanism of a linotype-machine, of a mold bottom-plate and a mold cap-plate capable of being separated for a distance not less than the thickness of a linotype to open the mold, one of them having a core or cores fast to the casting-face of it; a mold-cavity for a narrow linotype; a mold-cavity for a sprue; a device on or in the casting-face of each plate to hold the linotype and sprue respectively thereto; an elevation on the casting-face of one plate in the direction of that of the other plate along the junction of the respective mold-cavities for the linotype and the sprue; mechanism for opening and closing the mold and mechanism for ejecting the linotype and the sprue.

7. The hereinbefore-described combination in the casting mechanism of a linotype-machine, of a mold bottom-plate; a mold cap-plate movable therefrom to open the mold; core or cores held to the casting-face of the said cap-plate; a device for opening the mold; and a device for unlocking, and for closing the mold.

8. The hereinbefore-described combination in the casting mechanism of a linotype-machine, of a mold bottom-plate; a mold cap-plate loosely held to the said bottom-plate so as to be movable therefrom to open the mold; a core or cores held to the casting-face of the said cap-plate; a device on the bottom-plate to hold the linotype up to it when the cap-plate is moved away from it; and an ejector-blade adapted to eject the said linotype from the mold.

9. The hereinbefore-described combination in the casting mechanism of a linotype-machine, of a mold bottom-plate; a mold cap-plate movable therefrom to open the mold; a core or cores held to the casting-face of the said cap-plate; springs interposed between the said plates to open the mold; pins fast to one of the said plates and engaging in holes in the other; a stop to limit the opening motion of the cap-plate; and an automatic device for closing and locking the mold.

10. The hereinbefore-described combination in the casting mechanism of a linotype-machine, of a mold-wheel; a mold bottom-plate fast thereupon; a mold cap-plate loosely held to the said bottom-plate so as to be movable therefrom to open the mold; a core or cores held to the casting-face of the said cap-plate; an automatic device for opening the mold; a star-wheel mounted upon the said mold-wheel near to the said mold cap-plate and capable by being turned more or less about its axis, of unlocking and of closing and locking the mold; and fingers fixed in respectively proper positions to engage the said star-wheel to turn it to unlock and to close and lock the mold.

11. The hereinbefore-described combination in the casting mechanism of a linotype-machine, of a mold consisting of two principal parts—a cap-plate and a bottom-plate movable from and to each other; a core or cores fast to, and a mold-cavity for a linotype in, the casting-face of one of them; a mold-cavity for a sprue; and devices on or in the casting-face of each plate to hold the linotype and sprue thereto respectively.

12. The hereinbefore-described combination in the casting mechanism of a linotype-machine, of a mold consisting of two principal parts—a cap-plate and a bottom-plate movable from and to each other; a core or cores fast to, and a mold-cavity for a linotype in, the casting-face of one of them; a mold-cavity for a sprue; devices on or in the casting-face of each plate to hold the linotype and sprue thereto respectively; and an elevation on the casting-face of one plate in the direction of that of the other plate along the junction of the respective mold-cavities for the linotype and the sprue.

13. The hereinbefore-described combination in the casting mechanism of a linotype-machine, of a mold consisting of two principal parts—a cap-plate and a bottom-plate movable to and from each other; a core or cores fast to, and a mold-cavity for a linotype in, the casting-face of one of them; a mold-cavity for a sprue; devices on or in the casting-faces of each plate to hold the linotype and sprue thereto respectively; an elevation in the casting-face of one plate in the direction of that of the other plate along the junction of the respective mold-cavities for the linotype and the sprue; mechanism for opening and closing the mold and mechanism for ejecting the linotype and sprue.

14. In a linotype-machine, a mold comprising two parts, between which the linotype is cast, springs tending to separate said parts, and mechanism for automatically closing said parts together before each casting action and releasing them subsequent to such action.

15. In a linotype-machine, a mold consisting of two separable parts, substantially as described, in combination with an automatically-actuated device for closing said parts before and releasing them after each casting action, and an intermediate spring, through which the closing devices exert a yielding pressure.

16. In a linotype-machine, a turning mold-wheel, a separable mold, having one of its members attached rigidly to said wheel and the other movable in relation thereto, in combination with springs tending to open the mold, and an automatically-acting mechanism to effect the closure of the mold previous to each casting operation.

17. In a linotype-machine, a rotary mold-wheel, a mold mounted therein and consisting of two separable parts, a mold-closing device also carried by said wheel, and external stationary means to operate said mold-closing device, substantially as described.

In testimony that we, CHARLES HOLLIWELL and WARWICK JAMES LEWIS, claim the foregoing as our joint invention we have signed our names hereto in the presence of the subscribing witnesses.

CHARLES HOLLIWELL.
WARWICK J. LEWIS.

Witnesses to the signature of Charles Holliwell:
FRANCIS A. JACKSON,
WILLIAM H. BURLING.

Witnesses to the signature of Warwick James Lewis:
CHAS. S. WOODROFFE,
HARRY S. COX.